(12) United States Patent
Engstrand

(10) Patent No.: US 7,180,053 B2
(45) Date of Patent: Feb. 20, 2007

(54) APPARATUS, A SYSTEM AND METHOD FOR DETERMINING A POSITION WITHIN A CYLINDER

(75) Inventor: Bradley Engstrand, Hartford, WI (US)

(73) Assignee: Motion Controls, LLC, Hartford, WI (US)

(*) Notice: Subject to any disclaimer, the term of this patent is extended or adjusted under 35 U.S.C. 154(b) by 261 days.

(21) Appl. No.: 10/697,585

(22) Filed: Oct. 29, 2003

(65) Prior Publication Data

US 2004/0089797 A1 May 13, 2004

Related U.S. Application Data

(63) Continuation-in-part of application No. 09/690,151, filed on Oct. 17, 2000, now Pat. No. 6,952,009.

(51) Int. Cl.
*G01D 5/34* (2006.01)
(52) U.S. Cl. ............... 250/231.1; 92/5 R; 91/1
(58) Field of Classification Search ......... 250/231.1, 250/573–577, 231.13–231.18; 92/5 R; 91/1; 73/119 A, 119 R, 120
See application file for complete search history.

(56) References Cited

U.S. PATENT DOCUMENTS

| | | | |
|---|---|---|---|
| 3,368,751 A | 2/1968 | Merrill | 235/201 |
| 3,374,477 A * | 3/1968 | Ejiri et al. | 341/9 |
| 3,703,682 A * | 11/1972 | Wickman et al. | 324/245 |
| 3,787,703 A * | 1/1974 | Topol | 250/574 |
| 3,885,872 A | 5/1975 | Howe, Jr. et al. | 356/4 |
| 4,150,299 A | 4/1979 | Kasiewicz et al. | 250/561 |
| 4,501,642 A | 2/1985 | Wells | 162/198 |
| 4,661,695 A | 4/1987 | Mori et al. | 250/227 |
| H000277 H * | 5/1987 | Lee et al. | 250/231.1 |
| 4,727,356 A * | 2/1988 | Abe et al. | 341/13 |
| 4,736,674 A | 4/1988 | Stoll | 92/5 |
| 4,806,707 A | 2/1989 | Landmeier | 178/18 |
| 4,902,903 A | 2/1990 | Segerson et al. | 250/561 |
| 5,164,605 A * | 11/1992 | Kidwell | 250/577 |
| 5,182,979 A | 2/1993 | Morgan | 92/5 |
| 5,291,031 A * | 3/1994 | MacDonald et al. | 250/577 |
| 5,650,613 A * | 7/1997 | Lewis | 250/231.18 |
| 5,744,705 A | 4/1998 | Derouen et al. | 73/116 |
| 5,977,778 A | 11/1999 | Chan et al. | 324/635 |
| 6,484,620 B2 * | 11/2002 | Arshad et al. | 92/5 R |
| RE37,969 E * | 1/2003 | Horton et al. | 250/231.13 |
| 6,730,927 B1 * | 5/2004 | Smith et al. | 250/573 |
| 6,952,009 B1 * | 10/2005 | Engstrand | 250/231.1 |

* cited by examiner

*Primary Examiner*—Thanh X. Luu
(74) *Attorney, Agent, or Firm*—Patents+TMS, P.C.

(57) ABSTRACT

An apparatus, a system and a method are provided for monitoring position of a machine element within a mechanical system and/or cleaning a machine element. A light source and sensor may be positioned within a cylinder. The sensor may detect the intensity of light within the cylinder as a shaft element moves throughout the cylinder. The measurement may indicate the position of the shaft element within the cylinder. An aperture may be placed within the cylinder to enable light to enter the cylinder. In addition, a seal, a wire brush and/or a bronze brush may be placed near an end wall of a cylinder. The seal may surround the shaft element.

22 Claims, 4 Drawing Sheets

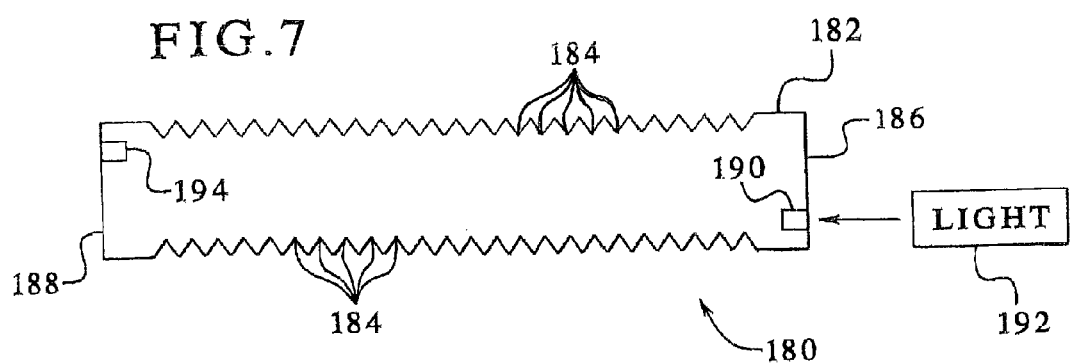
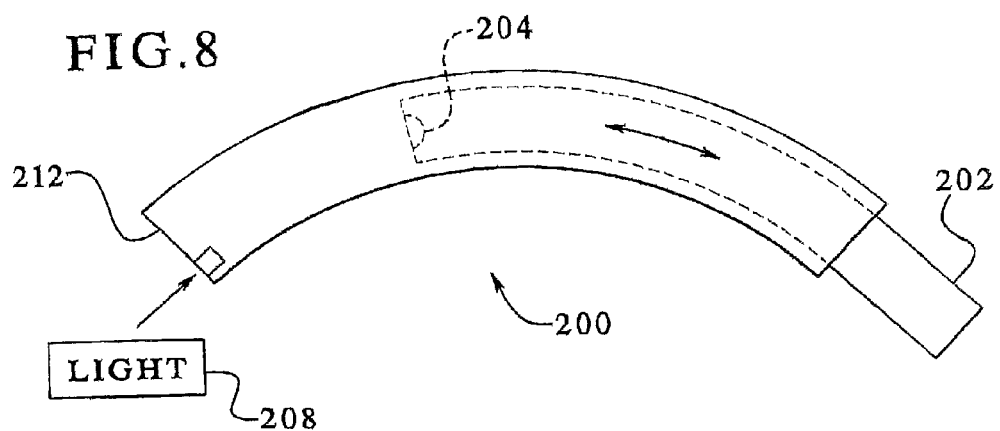
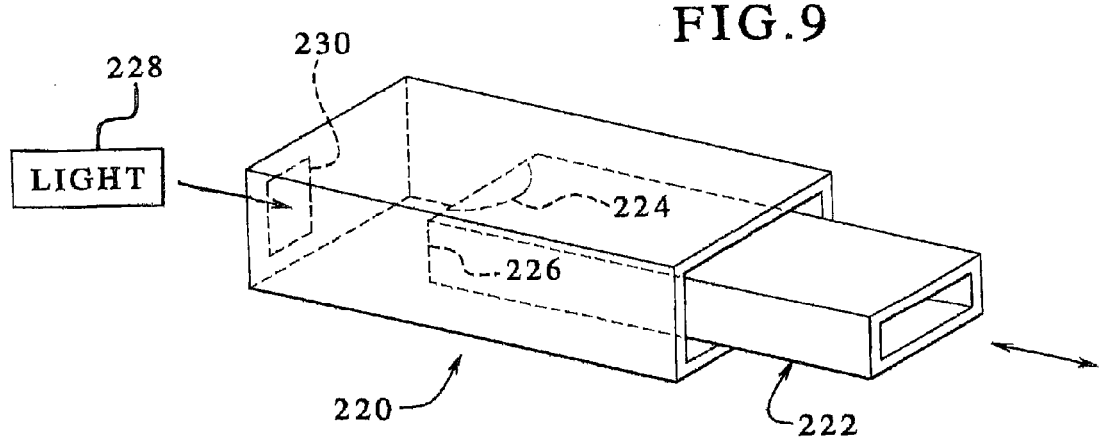

APPARATUS, A SYSTEM AND METHOD FOR DETERMINING A POSITION WITHIN A CYLINDER

This application is a Continuation-In-Part Application of U.S. patent application Ser. No. 09/690,151 filed on Oct. 17, 2000 now U.S. Pat. No. 6,952,009.

BACKGROUND OF THE INVENTION

The present invention generally relates to an apparatus, a system and a method for measuring position of a machine element and/or cleaning a machine element. More specifically, the present invention relates to an apparatus providing a sensor capable of detecting the position of a machine element within a mechanical system as well as providing a means for preventing and/or eliminating the accumulation of contaminants onto a machine element, such as a piston rod, or the like. In addition, the present invention provides a system and a method for measuring position of a machine element as well as a system and a method for prevention of contaminant accumulation onto a machine element.

It is, of course, generally known to measure position of a machine element in a mechanical system. System monitoring may lead to detection of irregularities within the system as well as an indication of the overall efficiency of the system. However, known monitoring systems generally utilize a sensor whereby contact is made between the sensor and the moving machine element. Moreover, extra components, such as sensors, attached to moving parts of a mechanical system may decrease the efficiency of the system. In other systems, a fluid, such as, for example, oil, may be stored within the system. Oil contained within, for example, a cylinder, may prevent detection of the machine element within the cylinder because the machine element cannot be monitored visually within the cylinder.

In addition, it is generally known to clean machine elements to prolong their period of use. Accumulation of contaminants onto machine elements can increase the wear on a machine element and decrease the period of use within a mechanical system. Furthermore, the accumulation of debris on a machine element may also decrease the efficiency of the machine element as well as the overall efficiency of the mechanical system.

A need, therefore, exists for an improved measurement device, system and method for monitoring position of a machine element within a mechanical system. Moreover, a need exists for an improved device, system, and method for preventing accumulation of contaminants onto machine elements.

SUMMARY OF THE INVENTION

The present invention provides an apparatus, system and method for monitoring a position of a machine element in a mechanical system. More specifically, the present invention relates to an apparatus, system and method for monitoring a position of a piston head, and/or a shaft which may be connected to the piston, within a cylinder. The position may be determined as a function of an amount of light which may enter the cylinder. The light may be detected by a sensor within the cylinder.

To this end, in an embodiment of the present invention, an apparatus is provided for monitoring position. The apparatus has a cylinder having walls defining an interior and further having a length defined between a first end and a second end. The apparatus also has a wall at the first end. In addition, the apparatus has a shaft having a length defined between a first end and a second end wherein a portion of the shaft is within the cylinder and wherein the shaft moves within the cylinder. The apparatus also has a head connected to the shaft. An aperture is provided within the wall at the first end wherein light projects through the aperture into the cylinder. The apparatus also has a sensor within the cylinder wherein the sensor detects intensity of light within the cylinder wherein the intensity corresponds to a position of the shaft.

In an embodiment, the apparatus further has a second wall at the second end of the cylinder wherein the second wall encloses the cylinder.

In an embodiment, the apparatus further has a second shaft within the cylinder.

In an embodiment, the apparatus further has a fluid within the cylinder.

In an embodiment, the sensor is adjacent to the second end of the cylinder.

In an embodiment, the aperture is at a center of the wall.

In an embodiment, the apparatus further has a light source adjacent to the first end of the wall wherein the light source projects the light through the aperture.

In an embodiment, the apparatus further has a magnet adjacent to the cylinder wherein the magnet effects movement of the head.

In another embodiment of the present invention, a system is provided for monitoring position. The system has a cylinder having walls defining an interior and having a shaft within the interior wherein the shaft extends through a wall of the cylinder and wherein the shaft is movable within the cylinder and further wherein the cylinder has an aperture in the wall adjacent to the shaft. The system also has a sensor within the cylinder wherein the sensor detects light within the cylinder and wherein an amount of light detected by the sensor corresponds to a position of the shaft within the cylinder.

In an embodiment, the sensor is located within the cylinder on a wall opposite the aperture.

In an embodiment, the system has a fluid within the cylinder.

In an embodiment, the system has a head attached to the shaft.

In an embodiment, the system has a second shaft within the cylinder wherein the second shaft is movable within the cylinder.

In an embodiment, the system has a window within the aperture.

In an embodiment, the system has a light source adjacent to the aperture wherein the light source projects light through the aperture.

In an embodiment, the system has a processor connected to the sensor.

In an embodiment, the system has a coating on the shaft wherein the coating absorbs light.

In another embodiment of the present invention, a method is provided for measuring a position of a shaft within a cylinder having walls defining an interior wherein the cylinder has an aperture within one of the walls and further wherein the cylinder has a shaft within the interior wherein the shaft is movable. The method has the steps of directing light into the cylinder through the aperture; detecting the light which enters the cylinder through the aperture; and relating an amount of light detected to the position of the shaft.

In an embodiment, the method further has the step of moving the shaft within the cylinder.

In an embodiment, the method further has the step of placing a fluid within the cylinder.

It is, therefore, an advantage of the present invention to provide an apparatus, a system and a method for measuring the position of a machine element within a mechanical system, such as a pneumatic or hydraulic cylinder or the like, without contacting the moving machine element.

Another advantage of the present invention is to provide an apparatus, a system and a method for measuring the position of a machine element within a mechanical system, that does not affect the motion of a machine element within a mechanical system.

Yet another advantage of the present invention is to provide an apparatus, a system and a method for measuring the position of a machine element within a mechanical system to allow detection of irregularities within the system.

Still another advantage of the present invention is to provide an apparatus, a system and a method for measuring the position of a machine element within a mechanical system to provide an indication of the overall efficiency of the mechanical system.

Another advantage of the present invention is to provide an apparatus, a system and a method for cleaning a machine element.

Still another advantage of the present invention is to provide an apparatus, a system and a method for cleaning a machine element allowing for a longer period of use of the machine element.

Yet another advantage of the present invention is to provide an apparatus, a system and a method for monitoring a position of a machine element within a cylinder wherein an aperture is provided in a cylinder to enable light to enter the cylinder and eliminate a need for a light source to be attached to the cylinder.

Another advantage of the present invention is to provide an apparatus, a system and a method for monitoring a position of a machine element within a cylinder wherein a sensor is provided in a cylinder to detect light which may enter the cylinder wherein the sensor may be located in one or more areas of the cylinder.

And, another advantage of the present invention is to provide an apparatus, a system and a method for monitoring a position of a machine element within a cylinder wherein a fluid, such as, for example, a gas or a liquid, may be used within the cylinder.

Still further, an advantage of the present invention is to provide an apparatus, a system and a method for monitoring a position of a machine element within a cylinder wherein a magnet may effect movement of a head and/or shaft within a cylinder.

Additional features and advantages of the present invention are described in, and will be apparent from, the detailed description of the presently preferred embodiments and from the drawings.

BRIEF DESCRIPTION OF THE DRAWINGS

FIG. 7 illustrates a cross-sectional view of a cylinder in another embodiment of the present invention.

FIG. 8 illustrates a cross-sectional view of a cylinder in another embodiment of the present invention.

FIG. 9 illustrates a cross-sectional view of a cylinder in another embodiment of the present invention.

DETAILED DESCRIPTION OF THE PRESENTLY PREFERRED EMBODIMENTS

The present invention generally relates to an apparatus, a system and a method for measuring position of a machine element and/or cleaning of a machine element, such as a piston rod or the like.

Figure 1:
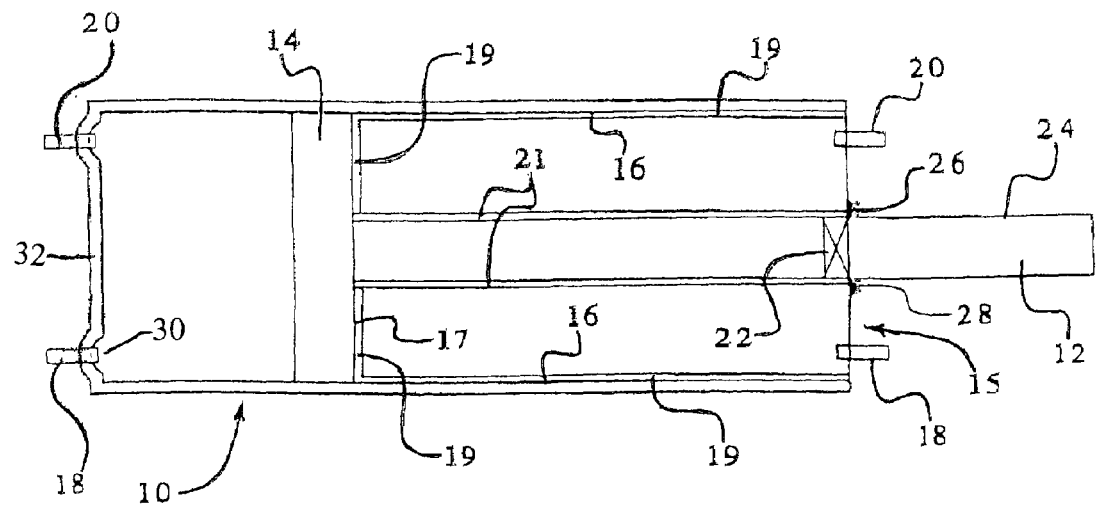
FIG. 1 illustrates a cross-sectional view of a cylinder in an embodiment of the present invention.

Referring now to the drawings wherein like numerals refer to like parts, FIG. 1 illustrates a cylinder machine element 10 having a shaft element 12 and a head 14 that operates cooperatively with the cylinder 10 in a manner well-known to one of ordinary skill in the art. The cylinder 10 may preferably be hydraulic or pneumatic. The cylinder 10 may also be any other type of cylinder known to one of ordinary skill in the art.

The cylinder 10 further may have an end wall 15 that may be perpendicular to the shaft 12 and that may substantially enclose the cylinder 10. The end wall 15 may surround the shaft 12. A light source 18 may be positioned on the end wall 15 of the cylinder 10 with the light from the light source 18 projecting into the interior of the cylinder 10. The light source 18 may be an LED light source or any other light source known by those skilled in the art. In addition, a light sensor 20 may also be placed on the end wall 15 of the cylinder 10 with the detecting portion of the sensor 20 directed towards the interior of the cylinder 10. The light sensor 20 measures the intensity of light within the cylinder 10 emitted by the light source 18 into the interior of the cylinder 10.

The cylinder 10 has an interior wall 16. The interior wall 16 may be coated with a substance 19 that may absorb a portion of the light emitted from the light source 18. The light absorbing coating 19 may be an anodizing compound. The surface 17 of the head 14 may also be coated with the light absorbing substance 19 or may be covered with a nitrile compound or other coating known by those skilled in the art to be light absorbing. Furthermore, the surface 24 of the shaft 12 may also be coated with a light absorbing substance 21 such as a nitrile compound, ceramic compound, or any other compound known by those skilled in the art to be coated onto a shaft that may also provide light absorbing and contaminant preventative properties. The coatings 19, 21 may have various colors that may affect and/or control the amount of light absorption.

As the head 14 and the shaft 12 transpose through the cylinder 10, a portion of the light emitted from the light source 18 may be absorbed by the coating 19 on the interior wall 16. A portion of the light emitted by the light source 18 may also be absorbed by the coating 19, 21 on the head surface 17. Lastly, a portion of the light emitted by the light source 18 may be absorbed by the coating 21 on the shaft surface 24. The light sensor 20 measures the intensity of light within the interior of the cylinder 10 that is not absorbed by the coatings 19, 21. The light sensor 20 may then transmit a signal indicative of the intensity to a processor 104, represented in FIG. 2. The processor 104 may be programmed to translate the measured intensity of the light emitted by the light source 18 that is within the cylinder 10 into a position measurement of the head 14 or shaft 12 within the cylinder 10.

In an alternate embodiment of the present invention, the cylinder 10 may have a groove 30 within an interior of an opposing end wall 32. Located within the groove 30 may be an additional light source 18 and/or an additional sensor 20. An advantage of placing the additional light source 18 and the additional sensor 20 within the groove may be to prevent the shaft element 12 and the head 14 from closing off the light path as the shaft element 12 and the head 14 move throughout the cylinder. A further advantage of placing the additional light source 18 and the additional sensor 20 within the opposing end wall 32 may be to obtain an average of two sensor readings which may provide greater accuracy in position measurement. In addition, the groove 30 may also be placed within the end wall 15 with the light source 18 and the sensor 20 placed within the groove 30.

Figure 2:
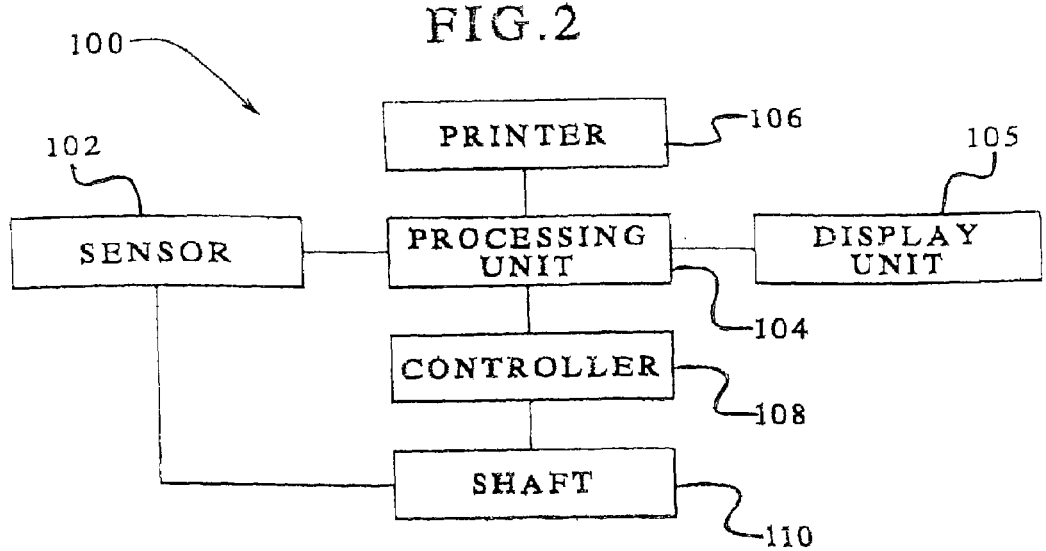
FIG. 2 illustrates a black box diagram of an embodiment of the system of the present invention.

FIG. 2 illustrates, in a black box diagram, an embodiment of a system 100 of the present invention. The system 100 includes a sensor 102 which may detect the intensity of light emitted by the light source 18 within the interior of the cylinder 10 that is not absorbed by the coatings 19, 21 within the system 100. An output signal from the sensor 102 may be transmitted to the processor 104 for signal interpretation and/or processing. The processor 104 may determine the position of the shaft 12 or head 14 within the cylinder 10.

A display unit 105 may be provided to display the absolute or relative position of the sensed shaft 12. A printer 106 may also be provided to print the results of the absolute or relative position of the shaft 12.

The processor 104 may be connected to a controller 108. After the output signal of the sensor 102 is processed by the processor 104, a signal may be transmitted to the controller 108. The controller 108 may then adjust the position of a machine element 110, such as a valve, which may affect the movement of the shaft 12 within the cylinder 10. The new position of the shaft 12 may provide the sensor 102 with a subsequent measurement which may eventually be processed by the processor 104 and may determine whether the machine element 110 may be adjusted to affect the position of the shaft 12 within the cylinder 10.

Figure 3:
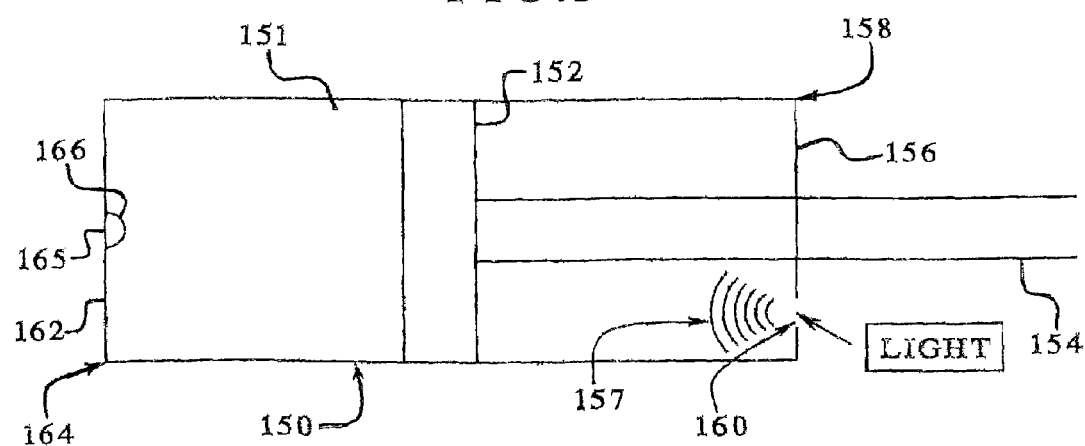
FIG. 3 illustrates a cross-sectional view of a cylinder in another embodiment of the present invention.

In another embodiment of the present invention, as illustrated in FIG. 3, a cylinder 150 is provided having an interior 151. The cylinder 150 may have a head 152 which may be connected to a shaft 154. The head 152 and the shaft 154 may move within the cylinder 150. The cylinder 150 may have a wall 156 at an end 158. The wall 156 may surround the shaft 154. An aperture 160 may be provided in the wall 156. The aperture 160 may enable light 157 to enter into the cylinder 150. The light 157 may be provided by, for example, natural light, such as, for example, sunlight, or may come from a light source, such as, for example, a bulb, LED, or like source. Preferably, the light 157 entering the cylinder 150 projects in a continuous stream.

A wall 162 may be provided at an end 164. A sensor 166 may be adjacent to a center 165 of the wall 162 and within the interior 151. Light 157 which may enter the cylinder 150 may be detected by the sensor 166. An amount of the light 157 detected by the sensor 166 may correspond to a position of the head 152 and/or shaft 154 within the cylinder 150. In an embodiment, the wall 156 and/or the wall 162 and/or the head 152 and/or the shaft 154 and/or any other component within the cylinder 150 may have a coating which may absorb the light 157 within the cylinder 150.

Figure 4:
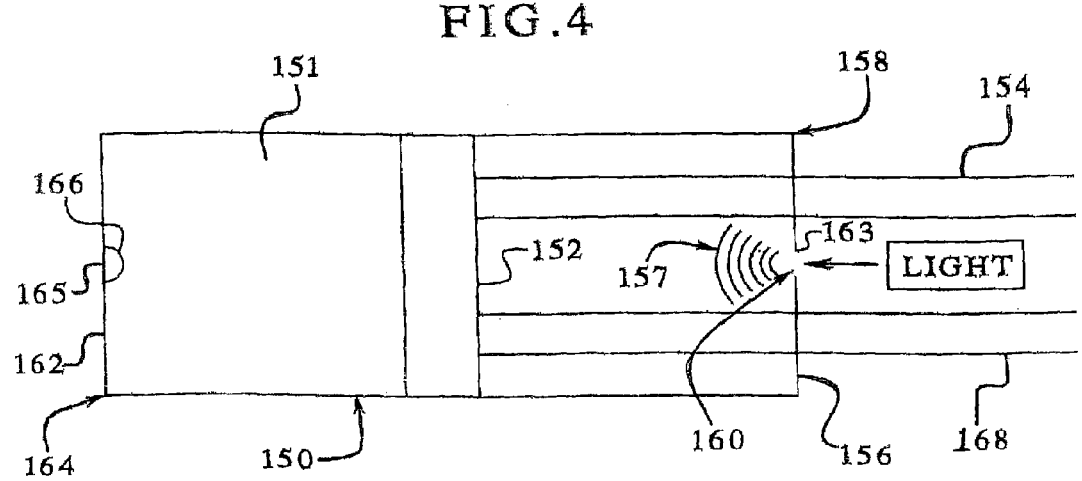
FIG. 4 illustrates a cross-sectional view of a cylinder in another embodiment of the present invention.

FIG. 4 illustrates the cylinder 150 wherein a second shaft 168 is connected to the head 152. The aperture 160 may be positioned at a center 163 of the wall 156. The sensor 166 may be located on the wall 162 at a position different from the center of the wall 162. Moreover, the light 157 which may enter the cylinder 150 may be detected by the sensor 166 independent of the positioning of the aperture 160 and the sensor 166.

Figure 5:
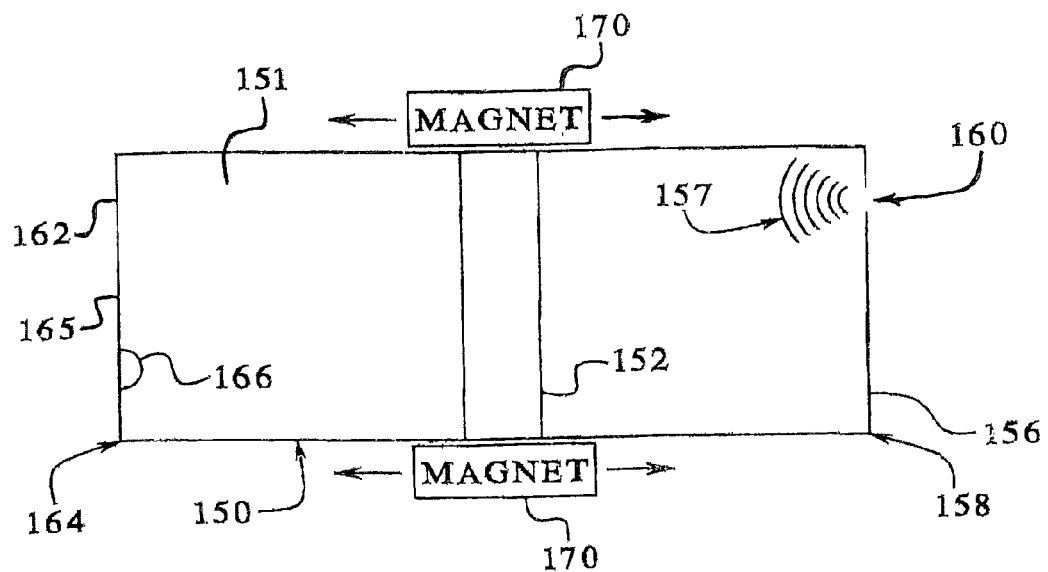
FIG. 5 illustrates a cross-sectional view of a cylinder in another embodiment of the present invention.

FIG. 5 illustrates the cylinder 150 wherein a magnet 170, or other magnetizing device may be provided adjacent to the head 152. In an embodiment, the magnet 170 may surround the cylinder 150 and may be aligned with the head 152. The magnet 170 may provide an attractive force toward the head 152. Further, the magnet 170 may be mechanically moved and may have an oscillatory motion. As a result, the attractive force of the magnet 170 may effect movement of the head 152 within the cylinder 150. The aperture 160 may be positioned at any point along the wall 156. Moreover, the sensor 166 may be positioned at any point along the wall 162. The sensor 166 may detect the light 157 which may enter the cylinder 150.

Figure 6:
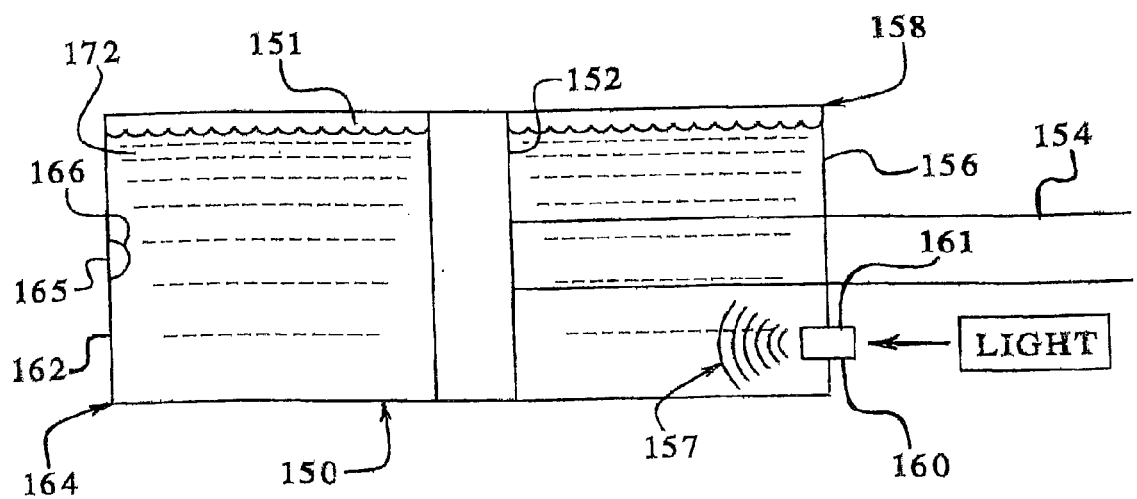
FIG. 6 illustrates a cross-sectional view of a cylinder in another embodiment of the present invention.

FIG. 6 illustrates the cylinder 150 wherein a fluid 172 is placed within the interior 151 of the cylinder 150. The fluid 172 may be, for example, water, or other translucent fluid. Accordingly, the fluid 172 may enable the light 157 which may enter the cylinder 150 to travel from the end 158 to the end 164. The light 157 may enter through a window 161 positioned within the aperture 160. The light 157 may then be detected by the sensor 166 to determine a position of the head 152 and/or the shaft 154 within the cylinder 150.

The aperture 160 and the sensor 166 may allow a position of the shaft 154 to be determined based on an amount of light 157 detected. Accordingly, use of the aperture 160 and the sensor 166 may allow for variants in a cylinder. For example, a user may implement different sizes, shapes, or colors for the head 152 and/or shaft 154 or other components of the cylinder 150. The user may also implement different frequencies of light 157 and/or different types of sensors 166 which may detect various frequencies of light 157. The user may also implement coatings within the cylinder 150 which may absorb various amounts of light 157. In addition, use of a fluid within the cylinder 150 may enable the aperture 160 and the sensor 166 to be used in potentiometer applications, such as, for example, devices which may be submersed in a liquid to determine a depth of the liquid.

FIG. 7 illustrates a cylinder 180 which may be compressed or elongated. To this end, the cylinder 180 may have a wall 182 which may have depressions or ridges 184 extending from a first end 186 to a second end 188. The depressions or ridges 184 within the wall 182 may enable the cylinder to be compressed or elongated by application of a force against the end 186 and/or the end 188. A light source 190 may be attached within the cylinder 180 at the end 186. In an embodiment, the light source 190 may be a bulb, LED, or like source. In another embodiment, the cylinder 180 may have an opening (not shown) which may allow light to enter the cylinder 180. Light 192 which enters the cylinder 180 may be detected by a sensor 194 attached within the cylinder 180 at the end 188. An amount of light 192 detected within the cylinder 180 may correspond to an amount of compression of the cylinder 180.

FIG. 8 illustrates a cylinder 200 which may have a curved shape. A shaft or tube 202 may traverse through the cylinder 200. The tube 202 may have a sensor 204 attached at an end 206 which may detect light 208 which enters the cylinder 200. The light 208 may be provided by a light source 210, or through an opening (not shown) in the cylinder 200, at an end 212. An amount of light 208 detected by the sensor 204 may correspond with a position of the tube 202 within the cylinder 200.

FIG. 9 illustrates a rectangular-shaped cylinder 220 through which a rectangular-shaped tube 222 may traverse. The rectangular shape of the cylinder 220 and the tube 222 may prevent the tube 222 from rotating within the cylinder 220 as the tube 222 traverses in and out of the cylinder 220. A sensor 224 may be attached to the tube 222 at an end 226. The sensor 224 may detect light 228 which may enter the cylinder 220 through an opening 230. An amount of light 228 detected by the sensor 224 may correspond to a position of the tube 222 within the cylinder 220.

FIG. 1 also illustrates a seal 22 which may be engaged onto the shaft 12. The seal 22 may be positioned near the end wall 15 of the cylinder 10. The seal 22 may be made from, for example, rubber. A first brush 26 may be positioned near the end wall 15 of the cylinder 10 as illustrated in FIG. 1. The first brush 26 may be a wire brush, preferably made from, for example, steel or any other metal or other material known by one of ordinary skill in the art. A second brush 28 may also be positioned near the end wall 15 of the cylinder 10 diametrically opposed to the first brush 26. The second brush may be made from, for example, bronze or any other metal or other material known by one of ordinary skill in the art.

The first brush 26 and the second brush 28 may be in contact with the surface 24 of the shaft 12. As the shaft 12 moves laterally through the cylinder 10, the first brush 26 and the second brush 28 may scrape contaminants, such as weld spatter, which may be deposited onto the surface 24 of the shaft 12. By scraping contaminants from the shaft 12, the first brush 26 and the second brush 28 allow the shaft 12 to move more efficiently through the cylinder, thus providing more accurate position measurements. The coating 21 on the surface 24 of the shaft 12 may be a nitrile coating, a ceramic coating or any other coating known by those skilled in the art capable of light absorption and also capable of preventing and/or reducing the accumulation of contaminants onto a surface 24 of the shaft 12.

The various embodiments of the present invention may be operated by any power supply known by those skilled in the art. In addition, the various embodiments may be operated in remote locations through the use of a small electric generator, from a pressurized air line, or the like.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for monitoring position, the apparatus comprising:
    a cylinder having walls defining an interior and further having a length defined between a first end and a second end wherein the first end is opposite to the second end of the cylinder;
    a first wall at the first end of the cylinder;
    a shaft having a length defined between a first end and a second end wherein a portion of the shaft is within the interior of the cylinder wherein the second end of the shaft moves between the first end of the cylinder and the second end of the cylinder within the interior of the cylinder wherein the second end of the shaft moves from a first position within the interior of the cylinder to a second position within the interior of the cylinder wherein the second end of the shaft transposes the interior of the cylinder between the first end and the second end of the cylinder;
    a second wall at the second end of the cylinder wherein the second position of the second end of the shaft is located between the first position and the second wall at the second end of the cylinder;
    an aperture within the first wall at the first end wherein light projects through the aperture into the cylinder; and
    a sensor at the second wall of the cylinder wherein the sensor detects intensity of light within the interior of the cylinder at the second end of the cylinder which is not absorbed by the shaft and the interior of the cylinder wherein the intensity of light detected by the sensor at the second wall corresponds to the second position of the shaft in the interior of the cylinder wherein a distance between the second end of the shaft and the second wall corresponds to the intensity of light detected by the sensor at the second wall.

2. The apparatus of claim 1 wherein the second wall encloses the cylinder.

3. The apparatus of claim 1 further comprising:
    a second shaft within the cylinder.

4. The apparatus of claim 1 further comprising:
    a fluid within the cylinder.

5. The apparatus of claim 1 wherein the sensor is adjacent to the second end of the cylinder.

6. The apparatus of claim 1 wherein the aperture is at a center of the first wall.

7. The apparatus of claim 1 further comprising:
    a light source adjacent to the first end of the wall wherein the light source projects the light through the aperture.

8. A system for monitoring position, the system comprising:
    a cylinder having walls defining an interior wherein the cylinder has a shaft within the interior wherein the shaft extends through a first wall of the cylinder and wherein the shaft transposes through the cylinder and moves from the first wall to a second wall of the cylinder within the interior of the cylinder and further wherein the cylinder has an aperture in the first wall adjacent to the shaft wherein light is continuously projected into the interior of the cylinder via the aperture; and
    a sensor on the second wall of the cylinder wherein the first wall is opposite to the second wall of the cylinder wherein the sensor is located within the interior of the cylinder wherein the sensor extends inward from the second wall to the interior of the cylinder wherein the sensor detects an amount of light within the cylinder at the second wall which is not absorbed by the shaft and further wherein the amount of light detected by the sensor corresponds to a position of the shaft within the interior of the cylinder.

9. The system of claim 8 wherein the sensor is located at a center of the second wall.

10. The system of claim 9 further comprising:
    a fluid within the system.

11. The system of claim 8 further comprising:
    a head attached to the shaft wherein the head is located between the sensor and the aperture.

12. The system of claim 8 further comprising:
    a second shaft within the cylinder wherein the second shaft is movable within the cylinder.

13. The system of claim 8 further comprising:
    a window within the aperture.

14. The system of claim 8 further comprising:
a light source adjacent to the aperture wherein the light source projects the light through the aperture.

15. The system of claim 8 further comprising:
a processor connected to the sensor.

16. The system of claim 8 further comprising:
a coating on the shaft wherein the coating absorbs light.

17. A method for measuring a position within a cylinder having walls defining an interior wherein the cylinder has an interior surface and an exterior surface wherein the cylinder has a length defined between a first wall and a second wall wherein the cylinder has an aperture formed in the first wall and further wherein the cylinder has a head within the interior wherein the head moves within the interior of the cylinder between the first wall to the second wall, the method comprising the steps of:

directing light into the interior of the cylinder through the aperture;

attaching a light sensor to the interior surface of the cylinder at the second wall wherein the light sensor is located within the interior of the cylinder wherein the head is located between the aperture and the light sensor;

detecting an amount of the light in the interior of the cylinder at the second wall which is not absorbed by the interior surface and the head of the cylinder wherein the light sensor detects the amount of light received from the aperture in the first wall;

moving the head of the cylinder within the interior of the cylinder between the first wall and the second wall of the cylinder wherein the head of the cylinder moves linearly with respect to the second wall of the cylinder; and determining a first position of the head in the interior of the cylinder with respect to the second wall of the cylinder wherein the first position of the head corresponds to the amount of light detected by the light sensor.

18. The method of claim 17 further comprising the step of:
moving the head to a second position within the cylinder wherein the second position is located between the first position of the head and the interior surface of the cylinder between the first wall and the second wall.

19. The method of claim 17 further comprising the step of:
placing a fluid within the cylinder.

20. The method of claim 17 further comprising the step of:
connecting a magnet to the head of the cylinder wherein the magnet is adjacent to the exterior surface of the cylinder.

21. A method for measuring a position within a cylinder having walls defining an interior wherein the cylinder has an interior surface and an exterior surface wherein the cylinder has an aperture within one of the walls and further wherein the cylinder has a head within the interior wherein the head is movable within the interior of the cylinder, the method comprising the steps of:

directing light into the interior of the cylinder through the aperture;

attaching a light sensor to the interior surface of the cylinder wherein the light sensor extends inward with respect to the interior of the cylinder;

detecting an amount of the light in the interior of the cylinder which is not absorbed by the interior surface and the head of the cylinder wherein the light sensor detects the amount of light;

determining a position of the head in the interior of the cylinder wherein the position of the head corresponds to the amount of light detected by the light sensor; and connecting a magnet to the head of the cylinder wherein the magnet is adjacent to the exterior surface of the cylinder.

22. A method for measuring a position within a cylinder having walls defining an interior wherein the cylinder has an interior surface and an exterior surface wherein the cylinder has a length defined between a first wall and a second wall wherein the cylinder has an aperture formed in the first wall and further wherein the cylinder has a head within the interior wherein the head is movable within the interior of the cylinder from the first wall to the second wall, the method comprising the steps of:

directing light into the interior of the cylinder through the aperture;

attaching a light sensor to the interior surface of the cylinder wherein the light sensor is located within the interior of the cylinder wherein the head is located between the aperture and the light sensor;

detecting an amount of the light in the interior of the cylinder at the second wall which is not absorbed by the interior surface and the head of the cylinder wherein the light sensor detects the amount of light received from the aperture in the first wall;

determining a position of the head in the interior of the cylinder wherein the position of the head corresponds to the amount of light detected by the light sensor; and connecting a magnet to the head of the cylinder wherein the magnet is adjacent to the exterior surface of the cylinder.

* * * * *